United States Patent
Lostanlen-Nouy et al.

(10) Patent No.: US 9,599,733 B2
(45) Date of Patent: Mar. 21, 2017

(54) METHOD FOR COLLECTING, IN A HARVESTER EQUIPMENT DISTINCT FROM A CENTRAL UNIT, DATA COMING FROM A PLURALITY OF SEISMIC ACQUISITION UNITS

(71) Applicant: Sercel, Carquefou (FR)

(72) Inventors: Sophie Lostanlen-Nouy, Nantes (FR); Fabien Le Moine, Bain de Bretagne (FR)

(73) Assignee: SERCEL, Carquefou (FR)

( * ) Notice: Subject to any disclaimer, the term of this patent is extended or adjusted under 35 U.S.C. 154(b) by 119 days.

(21) Appl. No.: 14/530,176

(22) Filed: Oct. 31, 2014

(65) Prior Publication Data
US 2015/0260865 A1 Sep. 17, 2015

Related U.S. Application Data

(60) Provisional application No. 61/951,900, filed on Mar. 12, 2014.

(51) Int. Cl.
*G01V 1/22* (2006.01)
(52) U.S. Cl.
CPC ............... *G01V 1/223* (2013.01); *G01V 1/22* (2013.01)
(58) Field of Classification Search
CPC .................................. G01V 1/223; G01V 1/22
USPC ........................................................... 367/14
See application file for complete search history.

(56) References Cited

U.S. PATENT DOCUMENTS

| | | |
|---|---|---|
| 3,062,315 A | 11/1962 | Herzog |
| 4,236,234 A | 11/1980 | McDavid et al. |
| 5,276,655 A | 1/1994 | Rialan et al. |
| 5,481,502 A | 1/1996 | Cretin et al. ................... 367/77 |
| 5,706,250 A | 1/1998 | Rialan et al. |
| 5,724,241 A | 3/1998 | Wood et al. |
| 5,822,273 A | 10/1998 | Bary et al. |
| 6,002,640 A | 12/1999 | Harmon |

(Continued)

FOREIGN PATENT DOCUMENTS

| | | |
|---|---|---|
| EP | 0182452 A1 | 5/1986 |
| EP | 0977365 A1 | 2/2000 |

(Continued)

OTHER PUBLICATIONS

US Patent Application, U.S. Appl. No. 14/611,827, filed Feb. 2, 2015.

(Continued)

*Primary Examiner* — Daniel L Murphy
(74) *Attorney, Agent, or Firm* — David D. Brush; Westman Champlin & Koehler, P.A.

(57) ABSTRACT

It is proposed a method for collecting, in a collecting device distinct from a central unit, data coming from a plurality of seismic acquisition units. The method includes a step of assigning at least one device as a sink unit. For a given sink unit, the method also includes the following steps for data specific to at least one seismic acquisition unit not assigned as a sink unit: transmitting the specific data from the at least one seismic acquisition unit to the given sink unit, via a radio path established in a radio multi-hop network built at least with the given sink unit and the plurality of seismic acquisition units; and transmitting the specific data from the given sink unit to the collecting device, via a link.

11 Claims, 5 Drawing Sheets

(56) References Cited

U.S. PATENT DOCUMENTS

| | | |
|---|---|---|
| 6,826,227 B1 | 11/2004 | Duval et al. |
| 7,224,642 B1 | 5/2007 | Tran |
| 7,715,887 B2 | 5/2010 | Cloutier et al. |
| 7,813,221 B2 | 10/2010 | Barakat et al. |
| 8,135,543 B2 | 3/2012 | Pavel et al. |
| 8,238,197 B2 | 8/2012 | Crice et al. |
| 8,407,008 B2 | 3/2013 | Pavel et al. |
| 8,547,796 B2 | 10/2013 | Wilcox et al. |
| 8,547,797 B2 | 10/2013 | Wilcox et al. |
| 8,605,544 B1 | 12/2013 | Baig et al. .................. 367/57 |
| 2004/0105533 A1 | 6/2004 | Iseli |
| 2006/0247505 A1 | 11/2006 | Siddiqui |
| 2008/0080311 A1 | 4/2008 | Eperjesi et al. |
| 2008/0080312 A1* | 4/2008 | Eperjesi ................ G01V 1/223 367/79 |
| 2008/0219094 A1 | 9/2008 | Barakat |
| 2008/0285385 A1 | 11/2008 | Cherry |
| 2009/0234585 A1 | 9/2009 | Ross et al. |
| 2011/0032794 A1 | 2/2011 | Rhodes et al. |
| 2011/0305114 A1 | 12/2011 | Golparian et al. |
| 2014/0078865 A1 | 3/2014 | Coste et al. |

FOREIGN PATENT DOCUMENTS

| | | | |
|---|---|---|---|
| GB | 2055467 A | | 3/1981 |
| WO | WO2007044459 | * | 4/2007 |
| WO | 2008033969 A2 | | 3/2008 |

OTHER PUBLICATIONS

Office Action from the Mexican Patent Office for Mexican Patent Application No. MX/a/2015/008924, dated Sep. 30, 2016.

* cited by examiner

METHOD FOR COLLECTING, IN A HARVESTER EQUIPMENT DISTINCT FROM A CENTRAL UNIT, DATA COMING FROM A PLURALITY OF SEISMIC ACQUISITION UNITS

1. CROSS-REFERENCE TO RELATED APPLICATION

The present application is based on and claims the benefit of U.S. provisional patent application Ser. No. 61/951,900, filed Mar. 12, 2014, the content of which is hereby incorporated by reference in its entirety.

2. FIELD OF THE DISCLOSURE

The field of the disclosure is that of seismic data acquisition systems. To collect geophysical data, the principle of operation of these systems is as follows: for a given seismic survey, one or several seismic sources (explosives, falling weights, vibrators, air guns, etc.) are activated to propagate omnidirectional seismic wave trains; the wave trains reflected by the layers of the subsurface are detected by seismic sensors, which generate a signal characterizing the reflection of the waves on the geological interfaces of the subsurface.

More specifically, the disclosure relates to a method for collecting, in a collecting device (e.g. a harvester equipment) distinct from a central unit, data coming from a plurality of seismic acquisition units.

The disclosure can be applied notably to the oil prospecting industry using seismic method, but can be of interest for any other field implementing a seismic data acquisition system.

3. TECHNOLOGICAL BACKGROUND

Typically, a seismic data acquisition system comprises a network connected to a central unit. The central unit collects the seismic data and processes them to generate a specific file (SEGD) analysed by the seismic community.

In a first known implementation (also referred to below as "wired implementation"), the network comprises a plurality of wired acquisition lines. Each wired acquisition line comprises nodes (also referred to as "seismic acquisition units") and concentrators, thus all data can be received in the central unit in a real-time manner. The nodes are assembled in series along a telemetry cable and are each associated with at least one seismic sensor (in general, strings of seismic sensors). These nodes process signals transmitted by the seismic sensor(s) and generate data. The data include seismic data and non-seismic data. The non-seismic data are for example QC data (for "Quality Control data"), i.e. information concerning the health of the node (such as battery level, synchronisation availability, sensor status, memory status, etc.). The concentrators are assembled in series along the telemetry cable and are each associated with at least one of the nodes. Each concentrator receives the data generated by the node(s) with which it is associated. The sensors are either analog sensors or digital sensors. When analog sensors (also referred to as "geophones") are used, they are generally interconnected by cables to form clusters referred to as "strings of geophones". One or several of these strings of geophones (in series or in parallel) are connected to each node and this latter performs an analog to digital conversion of the signal from the groups of geophones and send these data to the central unit (via the network of concentrators). When digital sensors are used (e.g. micro-machined accelerometers, also referred to as "MEMS-based digital accelerometer"), they are integrated in the nodes, thus eliminating the geophone strings. Each node integrates one or several digital sensors.

In a second known implementation (also referred to below as "wireless implementation"), the network comprises wireless seismic acquisition units. Each wireless seismic acquisition unit (also called "node") is independent and associated with (i.e. is connected to or integrates one or several functions of) one or several of aforesaid nodes and generates data (including seismic data and non-seismic data).

Figure 1:
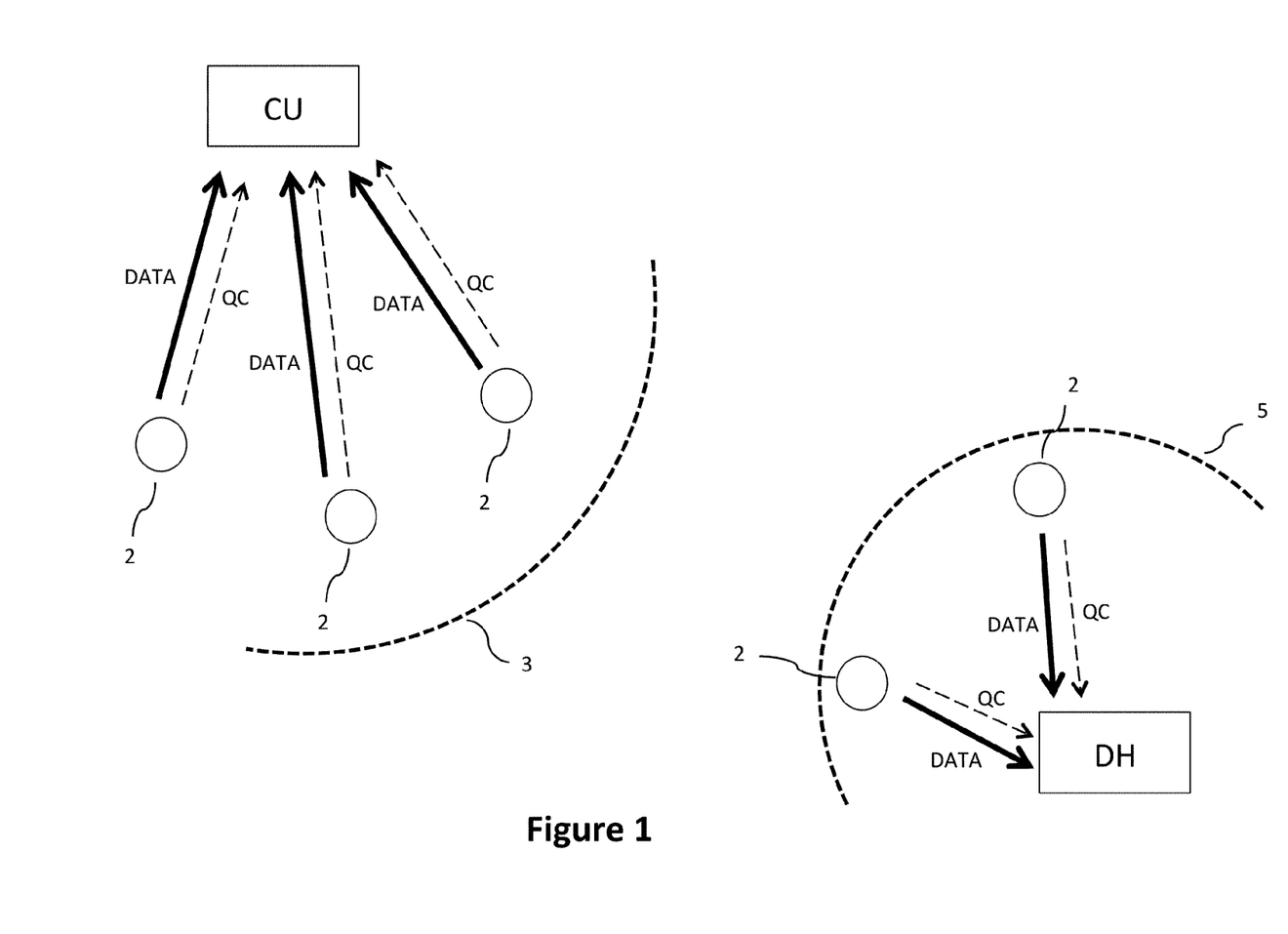
FIG. 1, already described with reference to the prior art, presents an example of known wireless implementation using wireless point-to-multipoint networks (one with the central unit acting as a central point, and the other with the harvester equipment acting as a central point)
Figure 2:
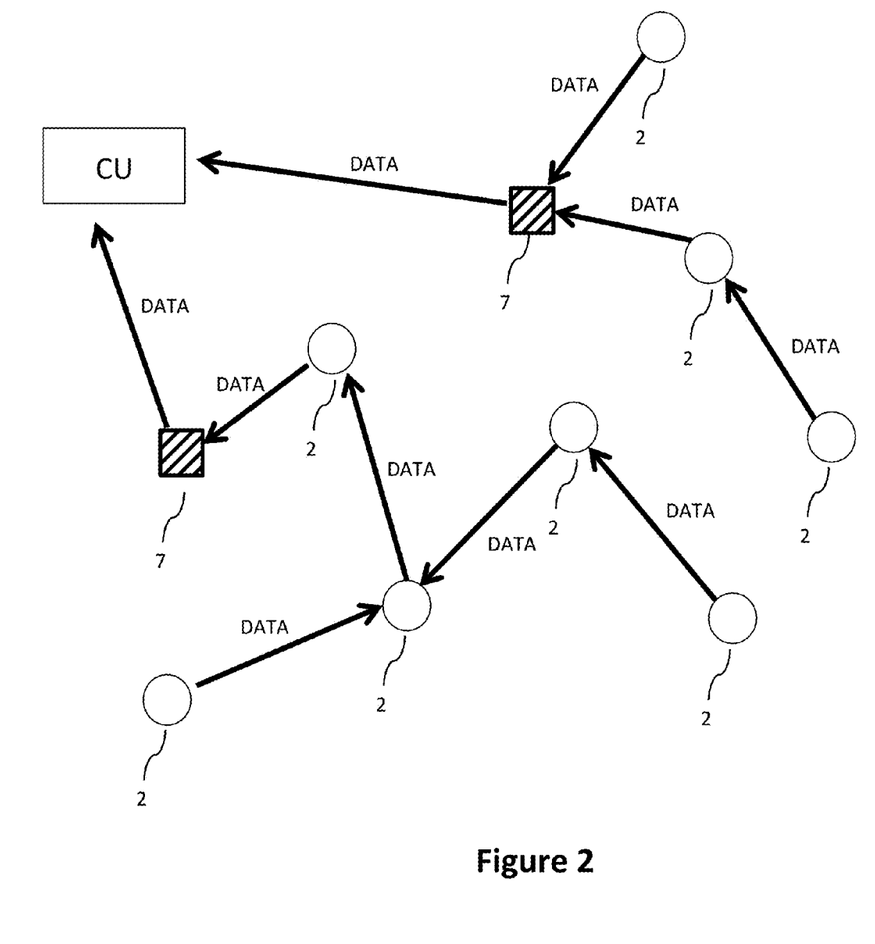
FIG. 2, already described with reference to the prior art, presents an example of known wireless implementation using a wireless multi-hop network.

In the wireless implementation, different kinds of networks have been proposed to collect (i.e. harvest) the data from the wireless seismic acquisition units to the central unit:

a) wireless point-to-multipoint network (WIFI for example), as shown in the example of FIG. 1:
   i. the central unit CU acts as a central point of a first wireless point-to-multipoint network and receives data (seismic data (noted "DATA") and non-seismic data (noted "QC")) from wireless seismic acquisition units 2 located in a coverage area 3 of the central unit;
   ii. if a "on the ground" data harvesting is implemented, each data harvester equipment DH (carried by an operator of a field team, also referred to as "harvester") acts as a central point of a second wireless point-to-multipoint network and receives data (seismic data (noted "DATA") and non-seismic data (noted "QC")) from wireless seismic acquisition units 2 located in a coverage area 5 of the harvester equipment;

b) wireless cellular network: the wireless seismic acquisition units behave as mobile stations of the wireless cellular network, and can send data (seismic data and non-seismic data) to the central unit, via the infrastructure of the wireless cellular network; and c) wireless multi-hop network, as disclosed in U.S. Pat. No. 8,238,197B2 and shown in the example of FIG. 2: wireless seismic acquisition units 2 and base stations 7 are nodes of a wireless multi-hop network (i.e. they are configured to communicate with surrounding nodes through wireless links). Seismic data (noted "DATA") are forwarded by the wireless seismic acquisition units 2 until they reach one of the base stations 7. In other words, each wireless seismic acquisition unit 2 send its seismic data to a base station 7 via a multi-hop path comprising a sequence of wireless seismic acquisition units. Each base station 7 is capable of transferring the received seismic data to a central unit CU (also referred to as "central control and recording system") by any suitable method (e.g. Ethernet, USB, fiber-optic link, wireless interface such as IEEE 802.11, etc.). U.S. Pat. No. 8,238,197B2 is silent about the transmission of the non-seismic data (e.g. QC data).

The wired implementation and the wireless implementation (whatever the kind of network used) have drawbacks discussed below.

Currently, in the wired implementation, the paths from the nodes to the central unit (i.e. seismic acquisition unit) are the same for the seismic data and the non-seismic data (e.g. QC data). That means that the non-seismic data are collected by the central unit which also collects and processes the seismic data. In other words, all the information is centralized in the central unit. A drawback is that the field team shall always communicate with the lab team that manages the central unit in order to obtain information (e.g. non-seismic data, but possibly also seismic data) concerning the seismic acquisition units deployed on the field. In other words, a field operator (of the field team) is not able to retrieve and process the non-seismic data coming from the seismic acquisition units, without any communication with the lab team. Thus, the field operator is not autonomous to manage the seismic acquisition units on the field.

Currently, when a wireless point-to-multipoint network is used in the wireless implementation, with the central unit (CU) acting as a central point (above case a-i and left side of FIG. 1), a drawback is that only wireless seismic acquisition units located in the coverage area of the central unit can access the wireless point-to-multipoint network and send their data to the central unit. Another drawback is that the field team has to communicate with the lab team (that manages the central unit) in order to obtain information (e.g. non-seismic data, but possibly also seismic data) concerning the wireless seismic acquisition units deployed on the field. Therefore, as for the wired implementation, the field operator is not able to retrieve and process the non-seismic data coming from the seismic acquisition units, without any communication with the lab team.

Currently, when a wireless point-to-multipoint network is used in the wireless implementation, with the harvester equipment (DH) acting as a central point (above case a-ii and right side of FIG. 1), the field team can directly collect seismic data and non-seismic data on the field. This case makes the field team more autonomous. However, it has other drawbacks: the wireless seismic acquisition units shall be configured (e.g. IP address or WIFI parameters or any network configuration parameters) in order to communicate with the harvester equipment; only wireless seismic acquisition units located in the coverage area of the harvester equipment can access the wireless point-to-multipoint network and send their data to the harvester equipment; the number of wireless seismic acquisition units that the harvester equipment can manage on the field is limited (e.g. one dozen); and the wireless seismic acquisition units located in harsh environment (forest, dense vegetation, etc.) are not accessible by the harvester equipment (i.e. all of them cannot be reached by the harvester equipment).

Currently, when a wireless cellular network is used in the wireless implementation (above case b), a main drawback is that a heavy infrastructure must be deployed on tens of $km^2$ areas to harvest all the data in real time. Moreover, the field team has to communicate with the lab team (that manages the central unit) in order to obtain information (e.g. non-seismic data, but possibly also seismic data) concerning the wireless seismic acquisition units deployed on the field. Therefore, as for the wired implementation, the field operator is not able to retrieve and process the non-seismic data coming from the seismic acquisition units, without any communication with the lab team.

Currently, when a wireless multi-hop network is used in the wireless implementation (above case c), as disclosed in U.S. Pat. No. 8,238,197B2, a real time harvesting of the seismic data (DATA), by the central unit, is possible only for a limited number of wireless seismic acquisition units because of the limited bandwidth of such networks and wireless seismic acquisition units suffer from high power consumption. The number of wireless seismic acquisition units deployed on the field is thus limited. Moreover, as this is a centralized configuration, the field team has to communicate with the lab team (that manages the central unit) in order to obtain information concerning the wireless seismic acquisition units deployed on the field. Therefore, even if we assume that the technique of U.S. Pat. No. 8,238,197B2 is used to transmit the non-seismic data (e.g. QC data) together with the seismic data (DATA), the field operator is not able to retrieve and process these non-seismic data coming from the seismic acquisition units, without any communication with the lab team.

4. SUMMARY

A particular embodiment of the disclosure proposes a method for collecting, in a collecting device distinct from a central unit, data coming from a plurality of seismic acquisition units. The method comprises a step of assigning at least one device as a sink unit. For a given sink unit, the method comprises the following steps for data specific to at least one seismic acquisition unit not assigned as a sink unit:

transmitting said specific data from said at least one seismic acquisition unit to said given sink unit, via a radio path established in a radio multi-hop network built at least with said given sink unit and said plurality of seismic acquisition units; and transmitting said specific data from said given sink unit to said collecting device, via a link.

Thus, this particular embodiment relies on a wholly novel and inventive approach combining:

a radio multi-hop network (seismic acquisition units being nodes of this network), used to send data (specific to these seismic acquisition units) towards a sink unit; and a link between the sink unit and the collecting device, this link being used to send to the collecting device the data collected by the sink unit (thanks to the radio multi-hop network).

Thus, a field operator who uses the collecting device (e.g. a harvester equipment) can retrieve and process data coming from the seismic acquisition units, without any communication with the lab team (that manages the central unit). The field operator is more autonomous to manage the seismic acquisition units on the field.

Moreover, the use of a radio multi-hop network provides several advantages, and notably:

the collecting device can manage seismic acquisition units even though they are located in harsh environment. Indeed, each seismic acquisition unit can be connected to the radio multi-hop network even in harsh environment;

it does not require configuring the seismic acquisition units in order to enable them to communicate with the sink unit. Indeed, a radio multi-hop network is able to self-configure, self-organize and self-health (no need to configure a seismic acquisition unit to enter it in the radio multi-hop network);

creation of the best network with respect to radio path, adapted to the environment.

According to a particular feature, said at least one device assigned as a sink unit is a seismic acquisition unit of said plurality.

Thus all seismic acquisition units can play the role of sink unit. All the nodes of the radio multi-hop network (i.e. all the seismic acquisition units) are identical, so there is no need for specific equipment.

According to a particular feature, said specific data are non-seismic data.

Thus there is a gain in autonomy for the field operators who can repair or change the seismic acquisition units of the spread thanks to the non-seismic data collected, on the field, by the collecting device.

Moreover, this collecting device (e.g. harvester equipment) can be an equipment that doesn't collect and process seismic data. This allows two distinct networks of data to coexist, one for seismic data and the other for non-seismic data.

The fact that the radio multi-hop network is used only for the non-seismic data (e.g. QC data) allows the collecting device to manage a higher number (improvement from dozens to hundreds) of seismic acquisition units, compared with the known solution of the harvester equipment acting as a central point of a wireless point-to-multipoint network (above case a-ii). Indeed, contrary to the seismic data, the non-seismic data is of small size, does not need to be transferred immediately, nor dated accurately, and does not need to be secured.

In an alternative embodiment, said specific data are both non-seismic data and seismic data, implying that both the radio multi-hop network and the link between the sink unit and the collecting device have a sufficient bandwidth.

According to a particular feature, said non-seismic data are Quality Control data.

This list is not exhaustive.

According to a particular feature, said link between said given sink unit and said collecting device belongs to the group comprising wired links and wireless links.

Thus any kind of link can be used.

According to a particular feature, said given sink unit is a wireless seismic acquisition unit, and in that said link between said given sink unit and said collecting device is a wireless link comprised in a point-to-multipoint wireless network deployed between said collecting device, acting as a central point, and at least said given sink unit which is located in a coverage area of said collecting device.

In this particular implementation, the radio multi-hop network (between wireless seismic acquisition units and the sink unit) is combined in an ingenious way with a point-to-multipoint wireless network (between the sink unit and the collecting device).

According to a particular feature, when at least two devices are each assigned as a sink unit, it comprises a step of selecting one of said sink units by each seismic acquisition unit not assigned as a sink unit, said step of selecting being carried out according to at least one selection criterion belonging to the group comprising:

- selection criteria based on sink unit priorities, each sink unit being affected a different priority level; and
- selection criteria based on quality of radio paths to each sink unit.

Thus each seismic acquisition units sends its aforesaid specific data to only one sink unit. The step of selecting can be carried out several times allowing a change of selected sink unit for a given seismic acquisition unit. For example, due to an attenuation of the signal path between the given seismic acquisition unit and a currently selected sink unit, another sink unit is selected (if any) and the given seismic acquisition unit switches to the newly selected sink unit.

Another particular embodiment of the disclosure proposes a seismic data acquisition system comprising:

- a collecting device, distinct from a central unit, for collecting data coming from a plurality of seismic acquisition units;
- at least one sink unit connected to the collecting device via a link; and
- a radio multi-hop network built at least with said at least one sink unit and said plurality of seismic acquisition units.

At least one seismic acquisition unit, not assigned as a sink unit, is configured to transmit specific data to said at least one sink unit, via a radio path established in a radio multi-hop network. Said at least one sink unit is configured to transmit said specific data to said collecting device via said link.

5. LIST OF FIGURES

Other features and advantages of embodiments of the disclosure shall appear from the following description, given by way of indicative and non-exhaustive examples and from the appended drawings, of which.

6. DETAILED DESCRIPTION

In all of the figures of the present document, identical elements and steps are designated by the same numerical reference sign.

Figure 3:
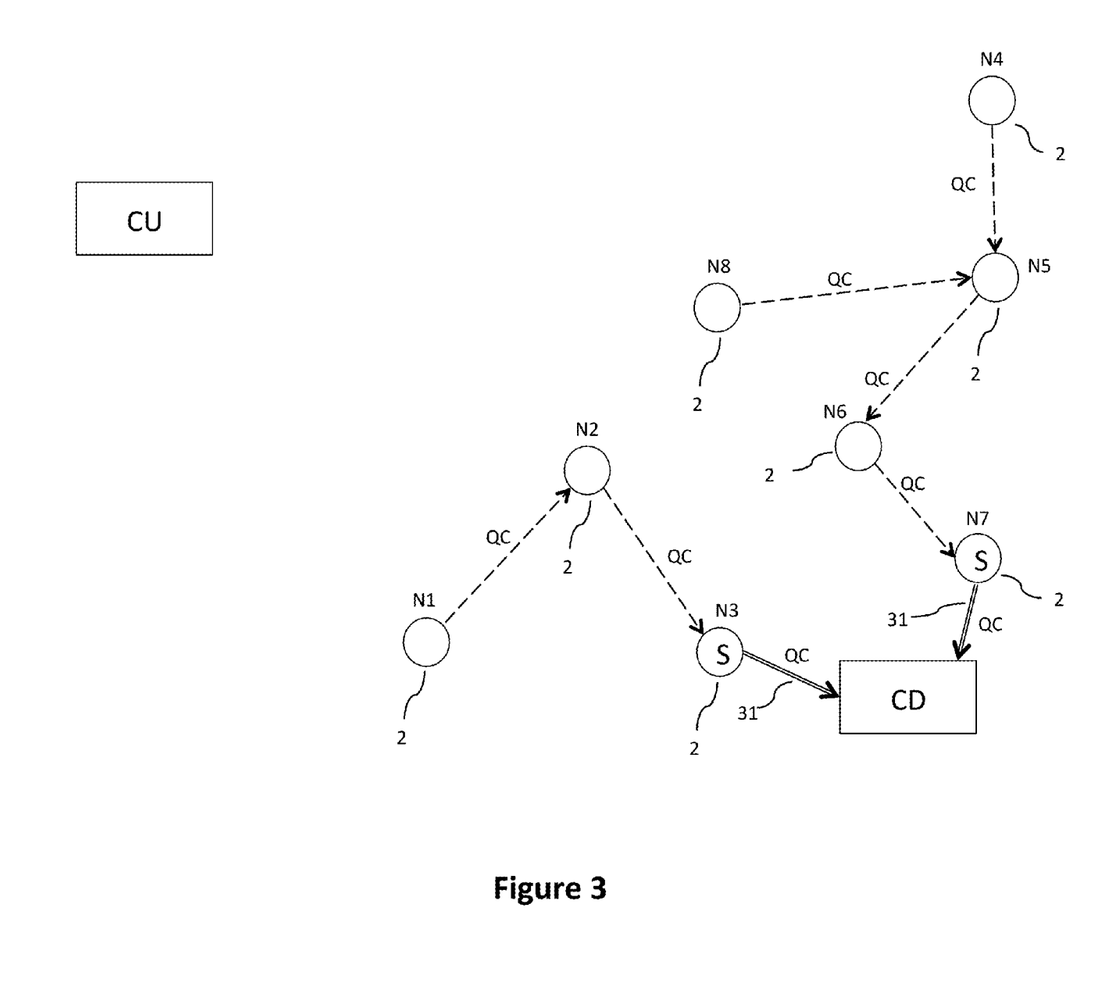
FIG. 3 is a partial view of a seismic data acquisition system in which is implemented a harvesting technique (i.e. a method for collecting) according to a first particular embodiment of the disclosure.

FIG. 3 is a partial view of a seismic data acquisition system in which is implemented a harvesting technique (i.e. a method for collecting) according to a first particular embodiment of the disclosure.

The seismic data acquisition system comprises notably:

- a central unit referenced CU;
- a (or at least one) harvester equipment, acting as a collecting device and referenced CD; and
- seismic acquisition units referenced 2.

In this first embodiment, we assume the seismic acquisition units 2 are of the wireless type and the specific data collected by the harvester equipment CD are non-seismic data, and more particularly QC data (referenced QC).

The present disclosure is not limited to these examples, and in alternative embodiments, for example, the seismic acquisition units can be of the wired type, and/or the specific data collected can be seismic data, or a combination of non-seismic data (e.g. QC data and/or any other non-seismic data) and seismic data.

According to the proposed technique, a radio multi-hop network is built, having as nodes the plurality of seismic acquisition units 2. The radio multi-hop network also comprises at least one special node, assigned as a sink unit referenced S. The central unit CU and the harvester equipment CD are not part of the wireless multi-hop network.

In the first embodiment illustrated in FIG. 3, each sink unit S can communicate with the harvester equipment CD, via a wired link 31 (e.g. an Ethernet link).

In the first embodiment illustrated in FIG. 3, there are two sink units S, and each of them is one of the seismic acquisition units 2. The present disclosure is not limited to this example, and in one or more alternative embodiments one sink unit or more than two sink units can be used, and/or a sink unit can be a device (node of the radio multi-hop network) which is not one of the seismic acquisition units.

The operation of the system is as follows: each seismic acquisition unit 2 not assigned as a sink unit transmits its QC data to one of the sink unit S, via a radio path established in the radio multi-hop network; then this sink unit S transmits these QC data to the harvester equipment (CD), via the link 31.

In the example of FIG. 3, the QC data of the seismic acquisition unit referenced N1 are sent to the seismic acquisition unit referenced N3, assigned as a sink unit S, via a radio path comprising a sequence of seismic acquisition units referenced N1, N2 and N3. The QC data of the seismic acquisition unit referenced N4 are sent to the seismic acquisition unit referenced N7, assigned as a sink unit S, via a radio path comprising a sequence of seismic acquisition units referenced N4, N5, N6 and N7. The QC data of the seismic acquisition unit referenced N8 are sent to the seismic acquisition unit referenced N7, assigned as a sink unit S, via a radio path comprising a sequence of seismic acquisition units referenced N8, N5, N6 and N7.

The proposed technique can be implemented with several harvester equipments (CD) operating simultaneously, each connected to one or several sink units S.

In the first embodiment described above and illustrated in FIG. 3, the proposed solution is one or several first networks specific to the QC data, and each comprising a harvester equipment CD and several seismic acquisition units 2 (one of which being assigned as a sink unit so as to communicate through a wired link 31 with the harvester equipment CD). This or these first networks coexist with a second network allowing the central unit CU or a harvester equipment DH according to the prior art to collect the seismic data DATA (and possibly also the non-seismic data QC). This second network can be of any known type.

For example, the second network is a wireless point-to-multipoint network (WIFI for example) as shown in FIG. 1, and in this case, in addition to the components enabling them to act as nodes of the radio multi-hop network, each seismic acquisition unit 2 (or some of them) comprises components enabling it to transmit data (e.g. seismic data (DATA) and QC data) in a wireless point-to-multipoint network (WIFI for example) as in the known technique of FIG. 1:
  towards the central unit CU acting as a central point of a first wireless point-to-multipoint network, if the wireless seismic acquisition unit 2 is located in a coverage area of the central unit;
  towards a harvester equipment DH according to the prior art, acting as a central point of a second wireless point-to-multipoint network, if the wireless seismic acquisition unit 2 is located in a coverage area of the harvester equipment.

Figure 4:
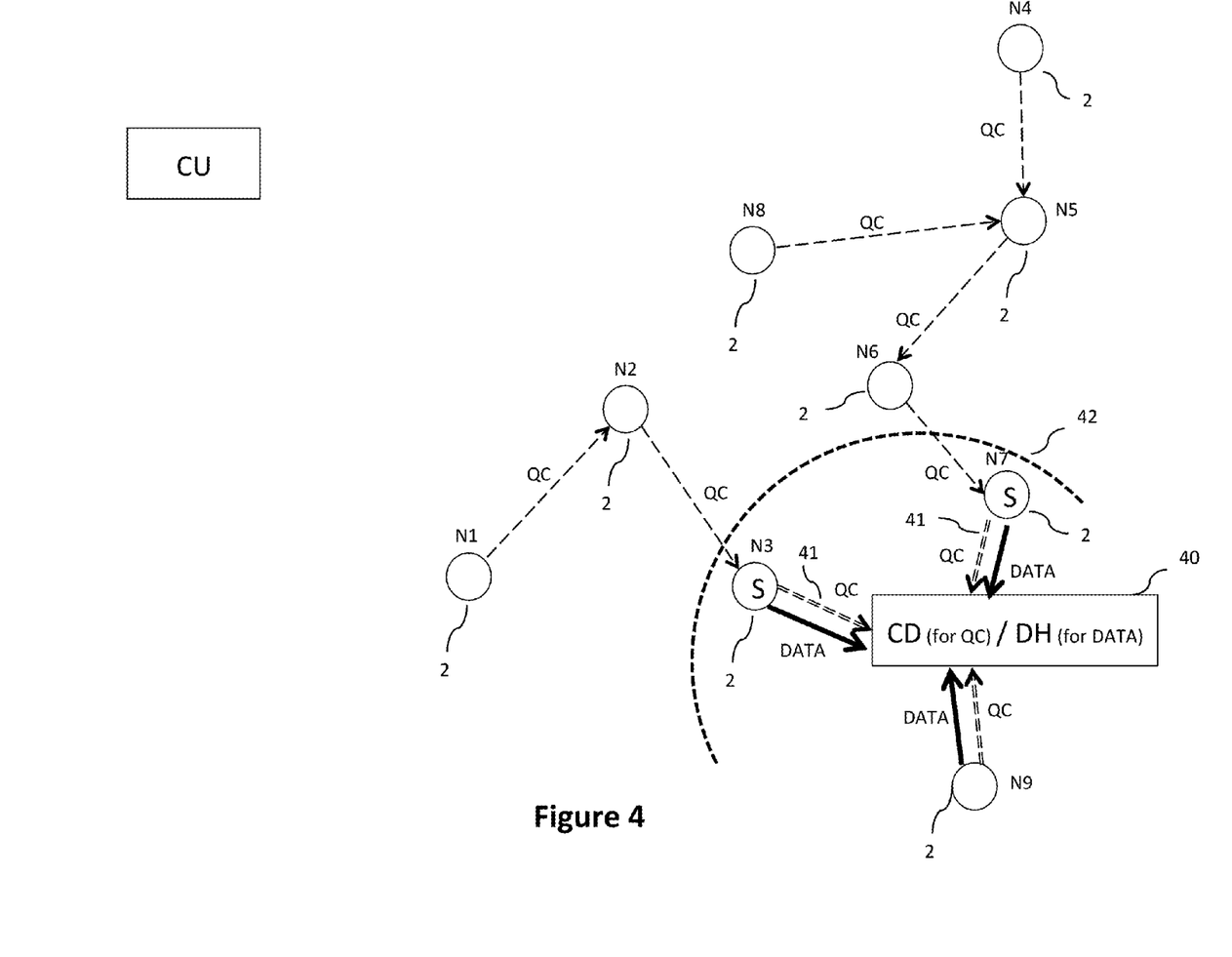
FIG. 4 is a partial view of a seismic data acquisition system in which is implemented a harvesting technique (i.e. a method for collecting) according to a second particular embodiment of the disclosure.

FIG. 4 is a partial view of a seismic data acquisition system in which is implemented a harvesting technique (i.e. a method for collecting) according to a second particular embodiment of the disclosure.

This second embodiment differs from the first one in that the link between each sink unit S and the harvester equipment CD is a wireless link 41 (e.g. a radio link (e.g. WIFI), an optical link, etc.).

In a particular implementation of the second embodiment, the wireless link 41 is comprised in a point-to-multipoint wireless network deployed between the harvester equipment CD, acting as a central point, and one or several sink units S located in a coverage area 42 of the harvester equipment CD. In other words, in addition to the components enabling each sink unit S to act as a node of the radio multi-hop network, each sink unit S comprises components enabling it to transmit data towards the harvester equipment CD acting as a central point of a wireless point-to-multipoint network (WIFI for example).

In the second embodiment described above and illustrated in FIG. 4, the proposed solution is one or several first networks specific to the QC data, and each comprising a harvester equipment CD and several seismic acquisition units 2 (one of which being assigned as a sink unit so as to communicate through a wireless link 41 with the harvester equipment CD). This or these first networks coexist with a second network allowing the central unit CU or a harvester equipment DH according to the prior art to collect the seismic data DATA (and possibly also the non-seismic data QC). This second network can be of any known type.

For example, the second network is a wireless point-to-multipoint network (WIFI for example) as shown in FIG. 1, and in this case, the components enabling each sink unit S to transmit data towards the harvester equipment CD can also be used to enable this sink unit S (which is a wireless seismic acquisition unit 2) to transmit data (e.g. seismic data (DATA) and QC data):
  towards the central unit CU acting as a central point of a first wireless point-to-multipoint network, if the sink unit S is located in a coverage area of the central unit;
  towards a harvester equipment DH according to the prior art, acting as a central point of a second wireless point-to-multipoint network, if the sink unit S is located in a coverage area of the harvester equipment.

In the particular case shown in FIG. 4, the harvester equipment is a combination of:
  a harvester equipment CD according to the proposed solution, used to collect the non-seismic data QC of some wireless seismic acquisition units. Each of the sink units in the coverage area of the harvester equipment CD (N3 and N7 in this example) collects QC data on a distinct multi-hop network and transmit them to the harvester equipment CD, e.g. using WIFI; and
  a harvester equipment DH according to the prior art, used to collect the seismic data DATA (and possibly also the non-seismic data QC) of the wireless seismic acquisition unit located in its coverage area (N3, N7 and N9 in this example).

More generally, any kind of wired link (Ethernet, optical fiber, . . . ) or wireless link (WIFI, Bluetooth, 3G, . . . ) can be used for the link between the collecting device and the sink unit.

FIGS. 5a to 5d illustrate successive steps of a harvesting technique (method for collecting) according to the aforesaid first or second particular embodiment of the disclosure (i.e., implemented in the seismic data acquisition system of FIG. 3 or 4).

As an illustrative and simplified example, we consider a radio multi-hop network comprising five seismic acquisition units, also referred to as nodes in the following description, and referenced "Node 1" to "Node 5".

The method for self-configuration and self-organization of the radio multi-hop network consists in several steps detailed below.

Figure 5A:
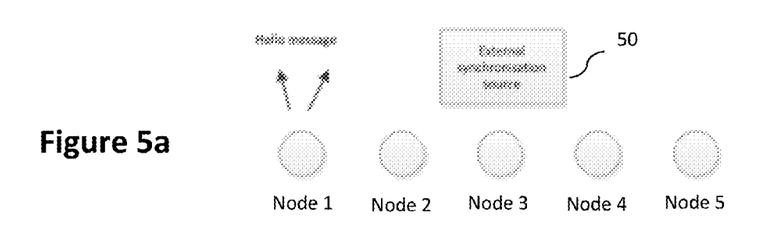
FIGS. 5a to 5d illustrate successive steps of a harvesting technique (method for collecting) according to the aforesaid first or second particular embodiment of the disclosure.

In a first step shown in FIG. 5a, the nodes wait for synchronization with an external synchronized source 50 (this source could be a GPS receiver). As soon as a node is synchronized, it sends a "Hello message" periodically to find a route to the sink and discover his neighbours.

Figure 5B:
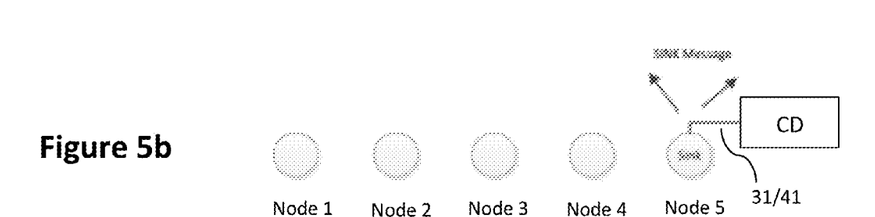

In a second step shown in FIG. 5b, a node is assigned as a sink node (Node 5 in this example). For example, a node declares itself as a sink node on the basis of a predetermined criterion (e.g. the closest node from the harvester equipment CD which will collect the non-seismic QC data, or the node having the best radio signal strength). In an alternative embodiment, a node becomes automatically a sink unit as soon as it is wirelessly connected or cabled to the harvester equipment CD. A link 31 (see FIG. 3) or 41 (see FIG. 4) between the sink node and the harvester equipment CD is established. This link can be a wired link (e.g. an Ethernet link) or a wireless link (e.g. a radio link or any other media).

As soon as a node is assigned as a sink node, it sends a "SINK message" periodically. Each other node, when receiving this "SINK message", directly from the sink node or relayed from neighbour nodes, is able to know at how many hops it is located from the sink node.

Figure 5C:
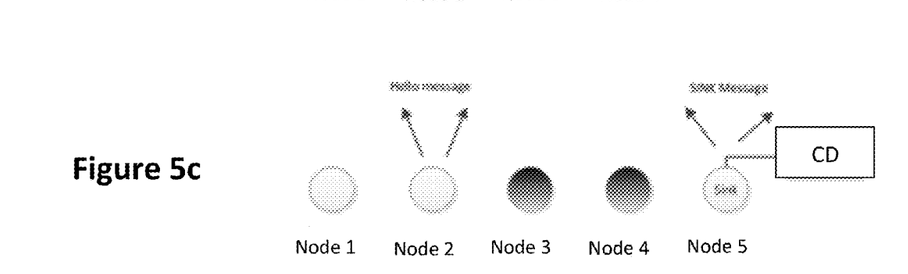

In a third step shown in FIG. 5c, the nodes not assigned as a sink node (i.e. Node 1 to Node 4 in the shown example) search the best route to reach the sink node, using the received "Hello messages" and "SINK message". For that, each node which is not located in the coverage area of the sink node: discovers its radio neighbours, selects the best radio neighbours (e.g. the ones having the best radio signal strength) and search the best path (e.g. the shortest one) to the sink node via one of the selected best radio neighbours. For example, let consider data to be transmitted from a node A to a sink unit, and two neighbour nodes B and C of node A. Node A knows the status of nodes B and C (each node B and C knows the number of hop to reach the sink unit, the shortest path, the battery levels of nodes on the path, etc.). One or several of fields defining the status of nodes B and C is (are) used as selection criteria by node A to select the best route to reach the sink node. In a particular embodiment, node A can also use as supplemental selection criteria the quality radio path between node A and each of the neighbour nodes B and C.

In the example shown in FIG. 5c, two nodes (Node 3 and Node 4) indicated in grey colour have found a route to the sink node and have started building the network.

Figure 5D:
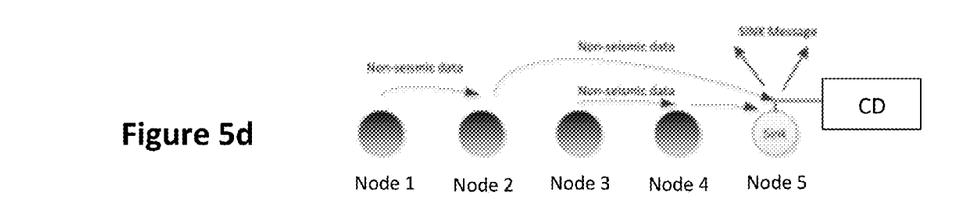

In a fourth step (routing) shown in FIG. 5d, the best radio path from each node to the sink node is established. A node only knows the route to his closest neighbours.

Then, the non-seismic data are sent periodically and propagate along the aforesaid radio paths, from neighbours to neighbours, until the sink node. Then the non-seismic data are collected by the harvester equipment CD, via the link 31/41.

Several harvester equipment CD can be used on the field, each with one or several sink nodes. So in particular embodiments, multiple sink nodes can be available on the field.

Nodes (other than sink nodes) cannot send their non-seismic data to several sink nodes. A node can select a sink node according to one or several parameters, e.g.:
- priority of the sink node: each sink node can be affected a distinct priority level such that non-seismic data are sent to the sink node having the highest priority;
- quality of route to the sink node: non-seismic data are sent to the sink node that offers the best route to it. Quality of the route can be based on one or several of the following parameters: number of hops to reach the sink node, RF path loss of the hops, battery level of relay nodes, . . . ;
- etc.

For a given node, the selected sink unit can change over time. For example, due to a loss of signal quality on the path between the node and the currently selected sink unit, the node selects another sink unit (if any).

An exemplary embodiment of the present disclosure provides a technique for collecting, in a collecting device (e.g. a harvester equipment) distinct from a central unit, data coming from a plurality of seismic acquisition units.

An exemplary embodiment of the disclosure provides a technique of this kind allowing a field operator to retrieve and process data coming from seismic acquisition units, without any communication with the lab team (that manages the central unit).

An exemplary embodiment of the disclosure provides a technique of this kind enabling the collecting device to manage a higher number of seismic acquisition units, compared with the known solution of the harvester equipment acting as a central point of a wireless point-to-multipoint network (above case a-u).

An exemplary embodiment of the disclosure provides a technique of this kind enabling the collecting device to manage seismic acquisition units even though they are located in harsh environment.

An exemplary embodiment of the disclosure provides a technique of this kind that allows two networks of data (one for seismic data and the other for non-seismic data) to coexist.

The various systems, units, devices, etc. described herein may be implemented on any form of computer or computers, and their components may be implemented as dedicated applications or in client-server architectures, including a web-based architecture, and can include functional programs, codes, and code segments. Any of the computers may comprise one or more of a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a non-transitory computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor. For example one or more parts of the system may be implemented by a computer processor with associated memory. In other exemplary embodiments, functions are implemented by hardware only, such as logic gates of an integrated circuit.

Although the present disclosure has been described with reference to one or more examples, workers skilled in the art will recognize that changes may be made in form and detail without departing from the scope of the disclosure and/or the appended claims.

The invention claimed is:

1. A method comprising:
   collecting, in a collecting device distinct from a central unit, data coming from a plurality of seismic acquisition units, said collecting device being used by a field operator and enabling said field operator to retrieve and process the collected data without any communication with a lab team which manages the central unit, wherein the collecting comprises:

assigning at least one device as a sink unit, and
wherein, for a given sink unit, the collecting comprises the following acts for data specific to at least one seismic acquisition unit not assigned as a sink unit:
transmitting said specific data from said at least one seismic acquisition unit to said given sink unit, via a radio path established in a radio multi-hop network built at least with said given sink unit and said plurality of seismic acquisition units; and
transmitting said specific data from said given sink unit to said collecting device, via a link.

2. The method according to claim 1, wherein said at least one device assigned as a sink unit is a seismic acquisition unit of said plurality.

3. The method according to claim 2, wherein said given sink unit is a wireless seismic acquisition unit, and wherein said link between said given sink unit and said collecting device is a wireless link comprised in a point-to-multipoint wireless network deployed between said collecting device, acting as a central point, and at least said given sink unit which is located in a coverage area of said collecting device.

4. The method according to claim 1, wherein said specific data are non-seismic data.

5. The method according to claim 4, wherein said non-seismic data are Quality Control data.

6. The method according to claim 1, wherein said link between said given sink unit and said collecting device belongs to the group consisting of wired links and wireless links.

7. The method according to claim 1, wherein at least two devices are each assigned as a sink unit and the collecting further comprises:
selecting one of said at least two sink units by each seismic acquisition unit not assigned as a sink unit, the selecting being carried out according to at least one selection criterion belonging to the group consisting of:
selection criteria based on sink unit priorities, each sink unit being affected a different priority level; and
selection criteria based on quality of radio paths to each sink unit.

8. A seismic data acquisition system comprising:
a collecting device, distinct from a central unit, configured to collect data coming from a plurality of seismic acquisition units, said collecting device being usable by a field operator and enabling said field operator to retrieve and process the collected data without any communication with a lab team which manages the central unit;
at least one sink unit connected to the collecting device via a link; and
a radio multi-hop network built at least with said at least one sink unit and said plurality of seismic acquisition units;
wherein at least one of the seismic acquisition units, not assigned as a sink unit, is configured to transmit specific data to said at least one sink unit, via a radio path established in a radio multi-hop network,
and wherein said at least one sink unit is configured to transmit said specific data to said collecting device via said link.

9. The seismic data acquisition system according to claim 8, wherein said at least one sink unit is a seismic acquisition unit of said plurality.

10. The seismic data acquisition system according to claim 8, wherein said specific data are non-seismic data.

11. The seismic data acquisition system according to claim 10, wherein said non-seismic data are Quality Control data.

* * * * *